Dec. 15, 1942.   R. R. DONALDSON   2,304,784
REGULATING DEVICES PROVIDED WITH FRICTION-FREE VALVES
Filed Nov. 1, 1940   2 Sheets-Sheet 2
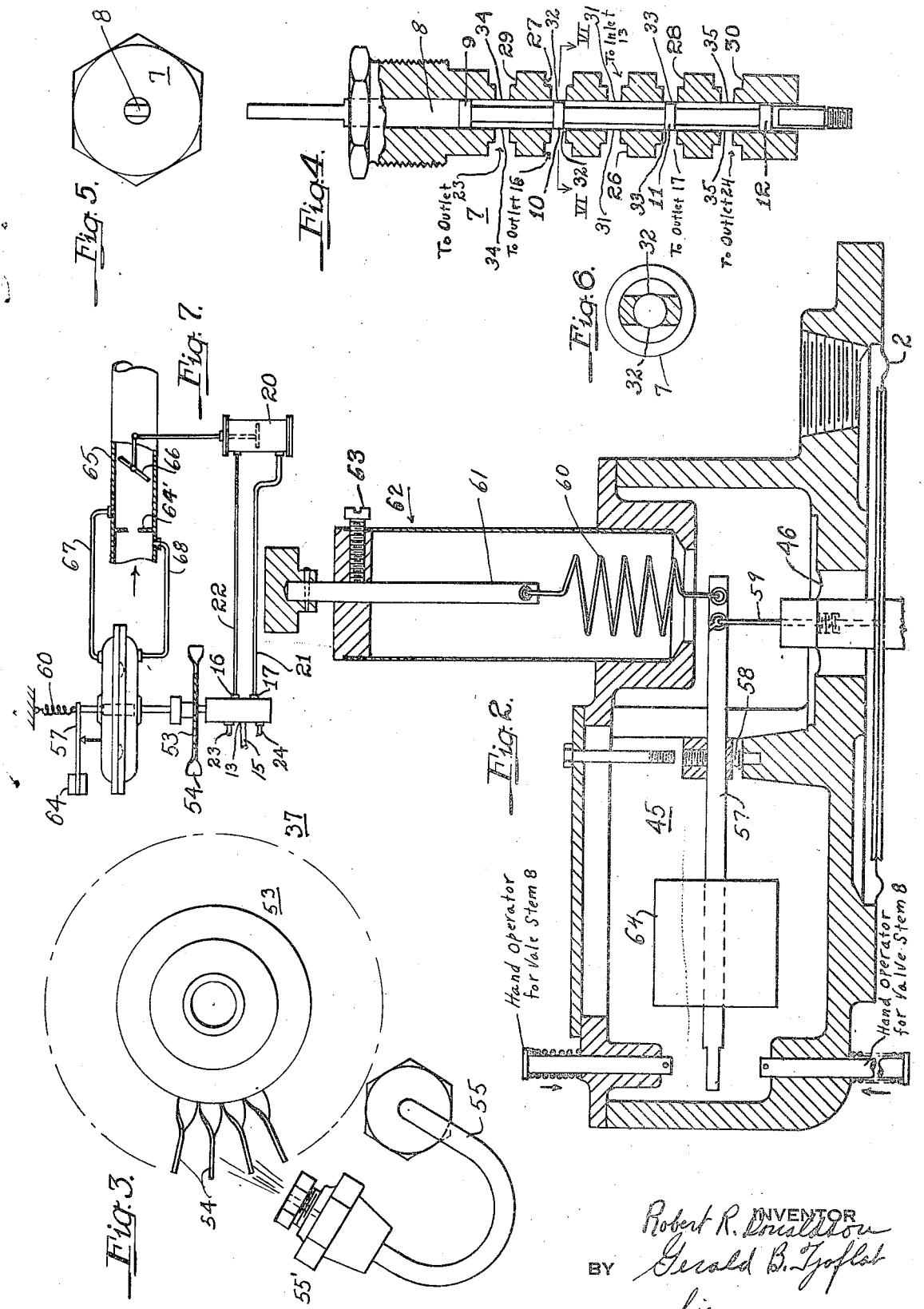

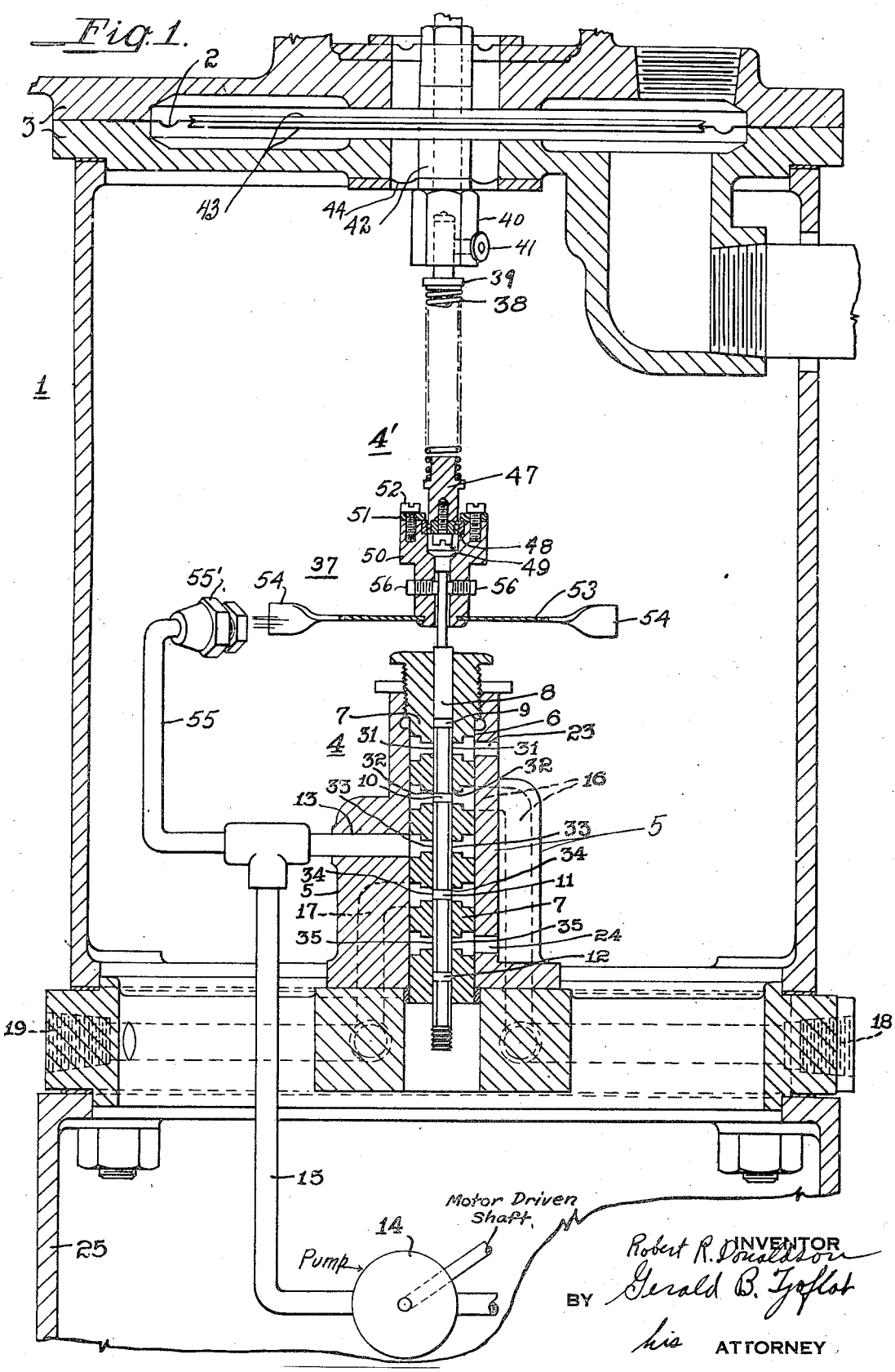

Patented Dec. 15, 1942

2,304,784

UNITED STATES PATENT OFFICE 2,304,784

REGULATING DEVICES PROVIDED WITH FRICTION-FREE VALVES

Robert R. Donaldson, Forest Hills, Pa.

Application November 1, 1940, Serial No. 363,882

9 Claims. (Cl. 137—153)

This invention relates to pressure-actuated devices of the type embodying a pressure-sensitive member such for example as a diaphragm, and a control member, for example a valve, actuated by the pressure-sensitive member and more particularly to a device that shall be provided with means which for all practical purposes frees the valve or control member of static friction, whereby the device may be rendered more sensitive to minute pressure changes acting on the pressure-sensitive member.

An object of this invention is to provide a pressure-actuated device having means for eliminating, for substantially all practical purposes, all static friction in its control member so that the pressure-actuating member for the control member will be rendered more effective in accurately initiating movement of and positioning the control member in response to pressure changes.

Another object of the invention is to provide a pressure-sensitive device of the type referred to above, having means for continually effecting relative movement between the control member or valve and the ported member of the valve in two planes simultaneously so that the control member may be free of static friction when moved in the direction in which it is actuated by the pressure-sensitive member.

Other objects of the invention will be apparent to those skilled in the art from the following description taken in conjunction with the accompanying drawings in which:

Figure 1 is a view in vertical section of a device, parts thereof being broken away, embodying what now appears to be a preferred form of the invention;

Fig. 2 is a view in vertical section of the upper portion of the device shown in Fig. 1;

Fig. 3 is a top plan view of certain structural details embodied in the device shown in Fig. 1;

Fig. 4 is a view in vertical section of a valve and valve sleeve embodied in the device shown in Fig. 1;

Fig. 5 is a top plan view of the valve and valve sleeve shown in Fig. 4;

Fig. 6 is a view in section taken on line VI—VI of Fig. 4; and

Fig. 7 is a more or less diagrammatic view of the device shown in Fig. 1 as applied in the control of a power cylinder which may be used to actuate any regulating device such as a damper or valve.

Throughout the drawings and the specification like reference characters indicate like parts.

In the drawings, and with particular reference to Fig. 1, a device 1 is shown which now appears to embody a preferred form of the invention. The device comprises a pressure-sensitive member 2, such as a diaphragm, disposed in a chamber or housing 3 and a control means 4 such as a valve, whose control element or valve member is operatively connected to the diaphragm by means 4' in such manner that movement of the diaphragm in response to changes in the pressure acting thereon results in corresponding changes in the control position of the control element or valve member.

Valve means 4 controls the pressure at which a power medium, such as water or oil, or other fluid, is discharged at the outlet port or ports thereof, the valve being connected to a supply source of power medium whose pressure is preferably maintained substantially constant at the inlet of the valve.

In cases where the power medium is delivered by the valve to an actuating device such as a power cylinder having a reciprocating piston therein, the valve is constructed preferably with two outlet ports and two discharge ports, one outlet being connected to one end of the power cylinder and the other outlet being connected to the opposite end of the cylinder. Thus, as the valve is moved within its range of travel the pressure medium is delivered to one end or the other of the cylinder and is exhausted from the opposite end causing the piston to move in one direction or the other at varying rates of speed, depending on the pressure of the fluid acting on the piston. If both outlets of the valve are closed or open slightly to the same extent, the piston remains stationary because the forces acting on its opposite faces are in balance.

Movement of the piston of the power cylinder when utilized to control the pressure of a gas or fuel, or the pressure in the combustion chamber of a furnace, affects the positioning of a damper or valve, and this damper or valve controls the pressure or pressures to which diaphragm 2 responds. Thus if device 1 is utilized for regulating pressures and maintaining such pressures constant within very small limits, the diaphragm would be subjected to the pressure which is controlled by the damper or valve which in turn is actuated by the piston of the power cylinder, the power cylinder being under control of device 1.

Valves of the type illustrated by Fig. 4 are ordinarily subject to considerable static friction. Where considerable static friction is involved, it follows that the pressure change on the operating diaphragm or pressure-sensitive member must be considerable at times to first free the valve before it can be moved. By the time movement of the valve has been effected, the change in pressure acting on the diaphragm and calling for a change in position of the valve will have exceeded by a considerable amount the value permitted for good regulation, because of the excessive change in pressure required to first overcome the static friction of the valve.

In order to obtain efficient and quick response to pressure changes, the valve actuated by the diaphragm or pressure-sensitive member, should be free of static friction. In particular, the valve should be free of static friction in the direction in which it is moved by the pressure-sensitive member, and preferably the valve should be free of friction in a direction normal to its line of motion as well.

Another factor which is equivalent of static friction or behaves in a manner similar to static friction in valves is the factor of adhesion. The adhesion factor comes into play only when there is flow throughout the valve. Nearly all valves when near their neutral or closed position have a tendency to be held in that position by a force which I designate as adhesion and is caused when there is flow of liquid, fluid or gases through the valve. Therefore, a valve to be free of static friction, for all practical purposes, must also be free of the factor of adhesion when it is near its neutral or closed position.

In accordance with this invention, static friction including the adhesion factor is eliminated for all practical purposes by continually spinning the valve about its longitudinal axis and continually vibrating the valve in a direction coincidental with its longitudinal axis. It is preferred to so construct the valve that nodeless vibration is obtained and so that the amplitude of vibration is a maximum when the valve is in neutral or closed position and which diminishes to a lesser but effective amplitude as the valve is actuated away from its neutral or closed position.

As shown in Fig. 1, the valve comprises a body 5 having a bore 6 for receiving a ported valve sleeve 7, within which a valve stem 8 is disposed and provided with a plurality of lands 9, 10, 11, and 12. The ports in sleeve 7 may be formed directly in the valve body if desired, but manufacturing considerations make it desirable to employ a sleeve.

The valve body is provided with an inlet 13 to which a supply of power medium, such as oil or water or other suitable fluid is connected. In the drawing, a pump 14 is shown as a means of supplying the power medium, the outlet of the pump being connected to a pipe 15 to the inlet of the valve body. The valve body is formed with outlet ports 16 and 17 which are connected to tapped outlet connections 18 and 19, to which, as is shown in Fig. 7, the opposite ends of a power cylinder 20 are connected by pipes 21 and 22, respectively. The valve body also is provided with outlet ports 23 and 24 through which oil or water may be exhausted from one end or the other of the power cylinder. The oil or liquid discharging from the valve may be caught in a reservoir or tank 25 in which the pump is located and is repumped by the pump to the valve inlet 13; in other words, the fluid system is of the closed type, although this is not essential except in so far as wastage of the fluid may be a factor.

The construction of sleeve 7 and valve stem 8 is shown more clearly to a larger scale in Fig. 4. The sleeve is machined to have a fluid-tight fit with bore 6 of the valve body and its upper end is enlarged and threaded so that the sleeve may have screw thread adjustment of position relative to the inlet, outlet, and exhaust ports of the valve body. The sleeve is provided with annular grooves 26, 27, 28, 29, and 30, which, when positioned in the valve body, lie in communication with the inlet, outlet, and exhaust ports of the valve body as shown in Fig. 1 and as indicated by the legends on Fig. 4. On diametrically opposite sides of the sleeve the bottom of each groove is machined flatwise or on the straight to a depth sufficient to cut through the wall of the sleeve whereby pairs of ports 31—31, 32—32, 33—33, 34—34, and 35—35 are formed. These ports provide communication between the inlet port 13 and the interior of sleeve 7, that is the bore of sleeve 7 in which valve stem 8 is disposed, and communication between outlet ports and exhaust ports and the interior of the sleeve.

Valve stem 8 is made from a rod of suitable metal such as stainless steel, for example, or other suitable alloy whose diameter is such as to provide a neat fit with the bore of sleeve 7. This valve stem is machined to provide lands 9, 10, 11, and 12 as shown in Figs. 1 and 4. Lands 9 and 12, respectively, are positioned one above and below ports 23 and 24 so as not to interfere with the discharge or exhaust of fluid from either end of power cylinder 20 but will effectively prevent leakage of fluid through either end of sleeve 7. The spacing of lands 10 and 11 is equal to the spacing of the pairs of ports 32—32 and 34—34 and thereby controls the delivery of fluid to one end or the other of the power cylinder and the discharge from the opposite end thereof through one or the other of the exhaust ports.

As may be seen by inspection of Figs. 1 and 4, the portions of stem 8 located between the lands 9, 10, 11, and 12, are considerably smaller in diameter than the main body of the stem. By making these portions of reduced diameter space is provided in which the fluid may flow from the inlet port to either of the outlet ports 16 and 17 or from the ends of the power cylinder 20 to the exhaust ports 23 and 24.

When valve stem 8 is in the position shown in Figs. 1 and 4, lands 9 and 10 are in neutral or closed position. When in this position the cohesion factor exerts a force tending to hold the valve stem in this position. Likewise the static friction between the valve stem and the bore of valve sleeve 7 tends to hold the valve stem against movement. To overcome both the static friction and the factor of cohesion, means 37 are provided for effecting relative rotation between the valve stem 8 to sleeve 7 about the longitudinal axes thereof. This would be the vertical axis of the valve and sleeve with reference to the position in which the regulating device 1 is shown mounted in Fig. 1. Static friction and the factor of cohesion are further overcome by so designing the valve and the mass in the connecting means 4' that the valve will vibrate in a direction normal to its direction of spinning, which as shown in the drawing is coincidental with the longitudinal axis of the valve stem. I may produce relative rotation between the ported sleeve 7 and valve element 8 by rotating either the sleeve or the stem, or both, but for manufacturing reasons in so far as the form shown in the drawings is concerned, I prefer to spin valve element 8 and hold sleeve 7 in a stationary position. Of course, if the ports of sleeve 7 are formed in the valve body, in which case the sleeve would be omitted, valve element 8 would be spun and vibrated. Even though sleeve 7 were spun, I would still so design the valve that valve element 8 would vibrate.

An effective and simple means for producing vibration of the valve stem may be accomplished by designing the valve with "lead." The term "lead" means that valve lands 10 and 11 are made slightly smaller than the openings of ports 32—32 and 34—34, respectively, so that these ports are never completely covered when the valve stem is in neutral or closed position. Thus, when this valve is in neutral position and fluid is supplied to the inlet of the valve there will be leakage past valve lands 10 and 11 to the exhaust ports 23 and 24. Owing to the fact that this leakage cannot be exactly proportioned there results a slight unbalance in the valve, and this slight unbalance acts first in one direction and then the other which causes valve element 8 to vibrate. The vibration, of course, is permitted because the connecting means 4' includes a yielding connection such as a spring 38. Thus the power employed to produce vibration of valve stem 8 is taken from the source of fluid supply which is controlled by the valve stem 8. The unbalanced forces produced at the outlet of the valve together with the resilient mounting of the valve stem, results in the desired vibration. By incorporating in connection 4' sufficient mass, the amplitude and frequency of the vibration may be caused to assume any desired or necessary value for satisfactory and reliable operation.

Connecting means 4' comprises a relatively stiff spring, the upper end of which is threaded onto a stud 39 which in turn is secured to the interior of a socket member 40 by means of a screw 41. Socket member 40 is carried by a connecting link 42 which is secured to backing plates 43 disposed on either side of flexible member 2. The point where this link passes through the housing casing 3 is sealed by means of a sealing diaphragm 44 which is of such thinness and flexibility that it offers substantially no resistance to movement of diaphragm 2 or the parts connected thereto. The upper side of the diaphragm is connected to means 45 for counterbalancing the weight of the diaphragm 2 and the connecting means 4' and valve stem 8 so that the pressures acting on diaphragm 2 need not be wasted in overcoming weight or the force of weight-balancing springs.

The point where connecting link 42 passes through the upper side of housing 3 is sealed by means of a sealing diaphragm 46 which is flexible and offers substantially no resistance to movement of the diaphragm. Thus the space on either side of diaphragm 2 is pressure tight. Either or both spaces may be subjected to pressure so that the diaphragm will move in one direction or the other in accordance with the difference between such pressure, or only one side of the diaphragm need be exposed to the pressure which is to be regulated, in which case the other side of the diaphragm may be opened to the atmosphere so that the diaphragm will move in response to changes in the pressure to be regulated.

The lower end of the spring 38 is threaded onto a threaded stud 47. The lower end of this stud carries an anti-friction bearing 48 which is secured to the lower end of the stud by means of a screw 49. This bearing is caged in a socket member 50 which is secured to the bearing by means of an annular flange or ring 51 which in turn is secured to the socket member by means of screws 52. Ring 51 bears on the cage of the anti-friction bearing as shown in Fig. 1. The lower end of the socket member carries a propeller 53 which may be in the form of a disc formed with vanes 54 at its outer edge having the appearance of paddles. A jet of oil is utilized as a convenient form of power for turning the propeller. This jet of oil or fluid is derived from the supply of motive fluid delivered to inlet 13 of the valve body. A pipe 55 is connected to pipe 15 which is so shaped that a nozzle 55' secured thereto causes fluid in the form of a high velocity jet to strike or impinge on the paddles of the propeller and causes it to spin much in the same fashion as a turbine wheel is caused to turn when a jet of fluid is directed against its buckets.

Valve stem 8 is secured to a socket member 50 by means of set screws 56. Thus as the impeller is spun by the jet of fluid issuing from nozzles 55', valve stem 8 is caused to spin. The speed at which the valve stem 8 is spun may be varied or limited to any desired value by proper shaping of the impeller and the type of nozzle employed for directing the motivating jet against the vanes thereof. By making the socket member and the impeller of sufficient weight the vibratory system comprising the spring, the socket, its bearing, and the impeller may be caused to vibrate at the proper frequency as the result of the action of the fluid on lands 10 and 11 controlling the outlet ports of the valve. It has been observed in the actual operation of the device that when valve stem 8 is in the neutral position the amplitude of vibration is maximum, and that as the valve is moved either up or down and away from the neutral position the amplitude of vibration seems to become less, although the frequency of vibration does not appear to change materially if at all, and that vibration ceases when the valve is in one or the other of its wide-open positions.

By spinning and vibrating valve stem 8 as above described, it has been found that valve stem 8 may be moved throughout its full range of travel in response to a pressure change as low as 0.001 of an inch of water. It has also been observed in actual operation of this valve that the valve may be moved on the slightest or minutest change in pressure. Since the valve does not stick and static friction does not have to be overcome, the response of diaphragm 2 to pressure changes results in almost immediate movement of valve stem 8.

I have shown in Fig. 2 the counterbalancing mechanism which supports the weight of the diaphragm 2 and its backing plates and the connection between the diaphragm and valve stem 8 as comprising a lever 57 which is mounted on a knife-edge 58 at a point intermediate its ends. One end of the lever is connected to a link 59 connected to diaphragm 2 and to a light spring 60. The upper end of spring 60 is connected to an adjusting rod 61 which may be moved up or down in its supporting member 62 and locked in any desired position by means of a set screw 63. The opposite end of the lever 57 carries a counterweight 64 which is adjustable along the lever so that a complete balance between the counterweight and the diaphragm and the mechanism suspended from it and connected to valve stem 8, may be obtained.

Where minute pressure changes are to be utilized in causing full range movement of valve 8 it is preferred that spring 88 be so light that it would have to be stretched, one inch for example, in order to produce a change in loading tension on the diaphragm equivalent to a pressure acting on the diaphragm of the order of 0.001 inch of water.

The operation of device 1 will be readily understood from the application of it to the control of a power cylinder as illustrated in Fig. 7. In this illustration, the pressure drop across an orifice 64' in a conduit 65 is to be maintained substantially constant by means of a damper or valve 66 connected to the piston of the power cylinder 20. One side of the orifice is connected by a pipe 67 to one side of diaphragm 2 and the other side of the diaphragm is connected by pipe 68 to the other side of the orifice. Thus when a gaseous flow occurs, the pressure drop developed is imposed on the diaphragm. Assuming that pump 14 is supplying fluid under pressure to the inlet of valve 4 and that device 1 has been adjusted until valve 66 is in the proper position to effect a flow that produces the desired pressure drop, then valve stem 8 will be in neutral position, spinning and vibrating. While it remains in this position the fluid pressures on each side of the piston in cylinder 20 will be equal and there will be a slight but continuous discharge of fluid from exhaust ports 23 and 24. If the pressure drop increases this indicates that valve 66 should be adjusted towards closed position. In response to the increase in pressure drop, diaphragm 2 moves downwardly whereby the inlet 13 is connected to outlet of the valve leading to the lower end of cylinder 20 and the top of cylinder 20 is connected to exhaust whereby the piston in cylinder 20 moves upwardly. As it moves upwardly, the pressure drop across orifice 64 decreases and when the desired pressure drop is attained movement of the piston stops because valve stem will have been returned to neutral position again. If the pressure drop decreases below the value desired valve stem 8 is moved upwardly and this causes fluid pressure to act on the top of the piston in cylinder 20, which fluid is exhausted from the lower end of the cylinder. This results in the damper or valve 66 being moved towards open position until the desired pressure drop is attained. As the desired value of pressure drop is approached, valve stem 8 is gradually being returned to neutral position.

It will be apparent from the above that when slight departures from the desired pressure drop occur valve stem 8 will be moved relatively slowly and by small amounts but that when the departure is large, valve stem 8 will be moved quickly and towards a wide-open position, causing the piston in the power cylinder to move rapidly and if necessary with a long stroke until the pressure change is restored to the desired value.

Having thus described the invention, what I claim as new and desire to secure by Letters Patent is:

1. A regulating device comprising a pressure-sensitive member, a valve having a movable control element, means yieldingly connecting said movable control element to said pressure-sensitive member, and means for continuously spinning said control element to reduce static friction between said control element and its cooperating valve parts.

2. A regulating device comprising a pressure-sensitive member, a valve having a movable control element, means yieldingly connecting said movable control element to said pressure-sensitive member, means for continuously spinning said control element to reduce static friction between said control element and its cooperating valve parts, and means for causing said control element to vibrate in a direction coincidental with the direction in which it is moved by said pressure-sensitive member.

3. A regulating device comprising a pressure-sensitive member, a valve including a ported member and a control element disposed to control the ports of said ported member, means rotating said control element relative to said ported member, means for vibrating said control element, and a resilient connection between said pressure-sensitive member and said valve control element.

4. In combination a valve having a movable control element, means for actuating said movable control element, a rotatable coupling connected to said control element, means yieldingly connecting said actuating means to said coupling, and means for rotating said coupling whereby said control element is rotated in said valve, the rotation of said control element effectively reducing static friction in said valve.

5. A combination according to claim 4 characterized by the fact that the rotating means includes an impeller member and a nozzle for directing a jet of motive fluid against said impeller causing it to rotate said coupling and the movable control element of said valve.

6. A combination according to claim 4 characterized by the fact that the rotating means includes an impeller member and a nozzle for directing a jet of motive fluid against said impeller causing it to rotate said coupling and the movable control element of said valve, and means for vibrating said movable control element in the direction in which it is moved by said actuating means.

7. A static friction-free pilot valve mechanism comprising a valve assembly having ported member and a valve element for controlling the ports of said ported member, a resilient support for said valve element, an actuator for moving the valve element, and means for effecting relative rotation between the ported member and the valve element.

8. A valve mechanism according to claim 7 characterized by the fact that means are provided for rotating one of the valve assembly elements to effect relative rotation between the ported element and the valve element.

9. A valve mechanism according to claim 7 characterized by the fact that the valve element is provided with lead so that when there is flow through the valve and the valve element is in or near its neutral position the valve element vibrates in the direction in which it is disposed to be moved by the actuator.

ROBERT R. DONALDSON.